I. J. PLOUGHE.
CHICKEN SEPARATOR.
APPLICATION FILED APR. 18, 1912.

1,043,140.

Patented Nov. 5, 1912.
3 SHEETS—SHEET 1.

WITNESSES
Philip E. Barnes
Edna J. Sheehy

INVENTOR
Isaac J. Ploughe
by James J. Sheehy & Co.
Attorneys

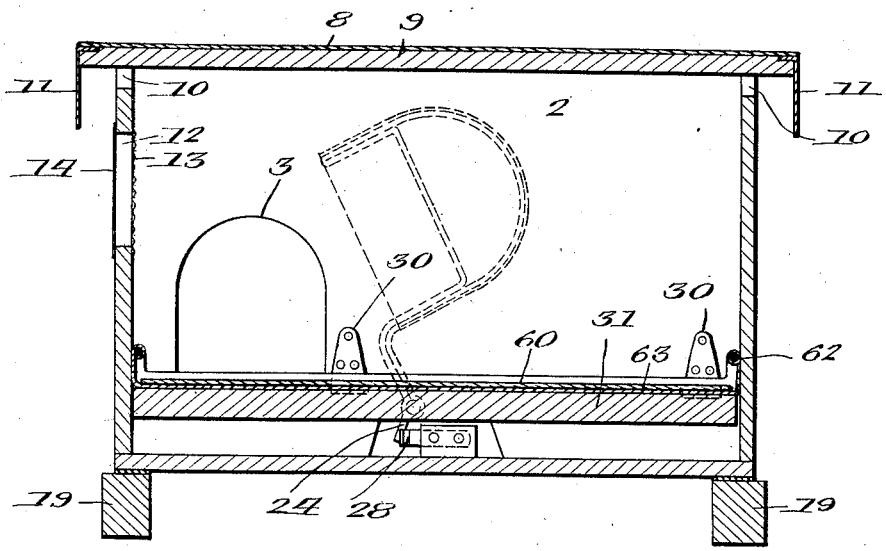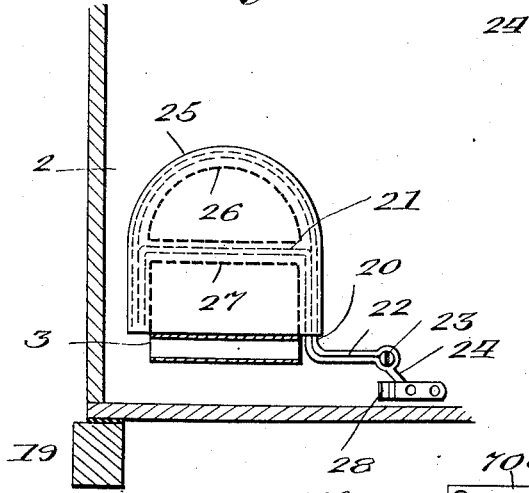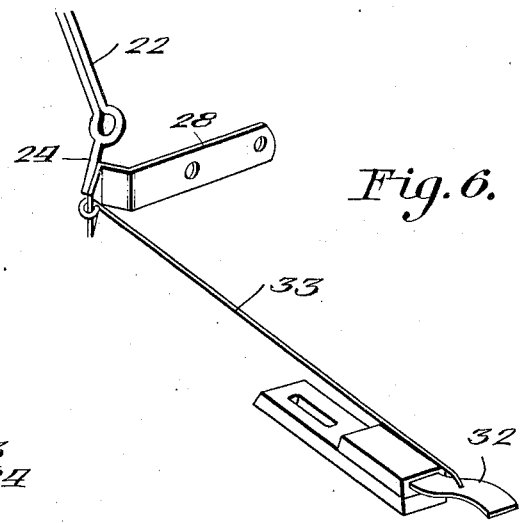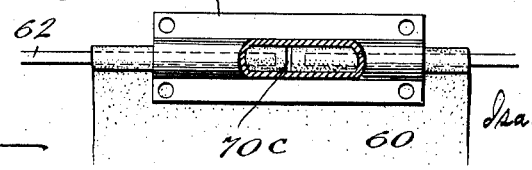

I. J. PLOUGHE.
CHICKEN SEPARATOR.
APPLICATION FILED APR. 18, 1912.
1,043,140.
Patented Nov. 5, 1912.
3 SHEETS—SHEET 3.
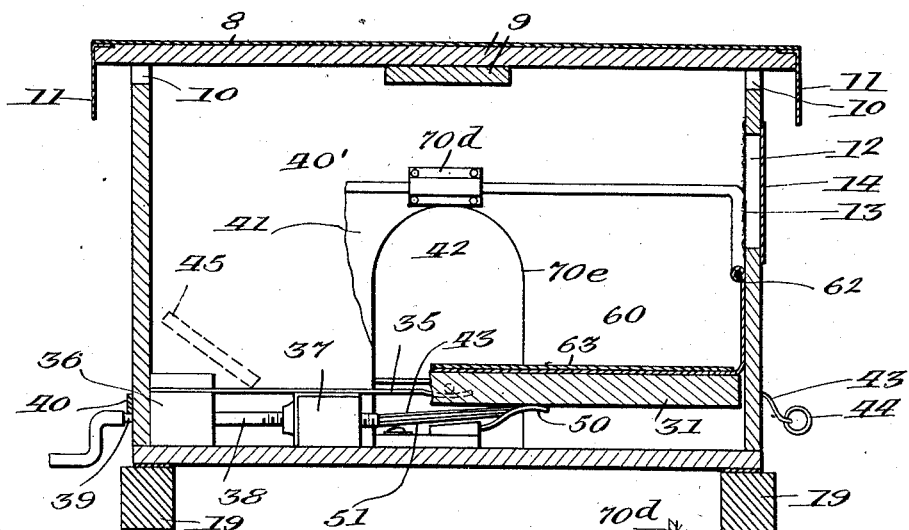
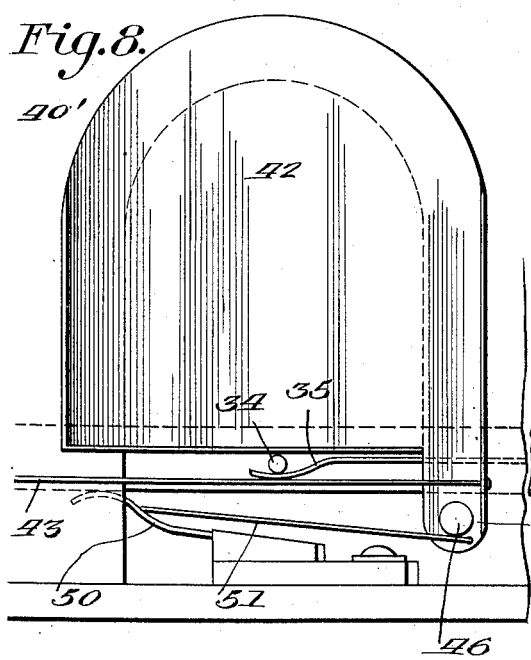
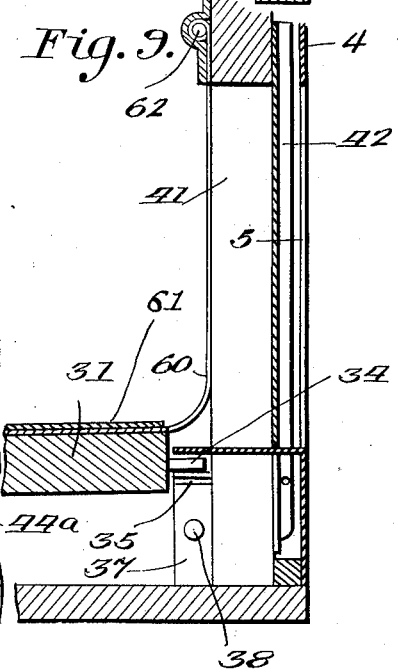
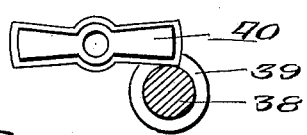
WITNESSES
Philip E. Barnes
Edna J. Sheehy
INVENTOR
Isaac J. Ploughe,
by
James J. Sheehy & Co., Attorneys
COLUMBIA PLANOGRAPH CO., WASHINGTON, D. C.

UNITED STATES PATENT OFFICE.

ISAAC J. PLOUGHE, OF PLAINVILLE, ILLINOIS.

CHICKEN-SEPARATOR.

1,043,140.  Specification of Letters Patent.  Patented Nov. 5, 1912.

Application filed April 18, 1912. Serial No. 691,595.

*To all whom it may concern:*

Be it known that I, ISAAC J. PLOUGHE, citizen of the United States, residing at Plainville, in the county of Adams and State of Illinois, have invented new and useful Improvements in Chicken-Separators, of which the following is a specification.

My present invention has for its general object to provide an automatic chicken separator calculated to exclude more than a predetermined number of young chickens with a view to obviating the greater part of the labor attending poultry raising, so that a very large number of chicks can be raised and cared for with but a minimum amount of labor.

Figure 1:
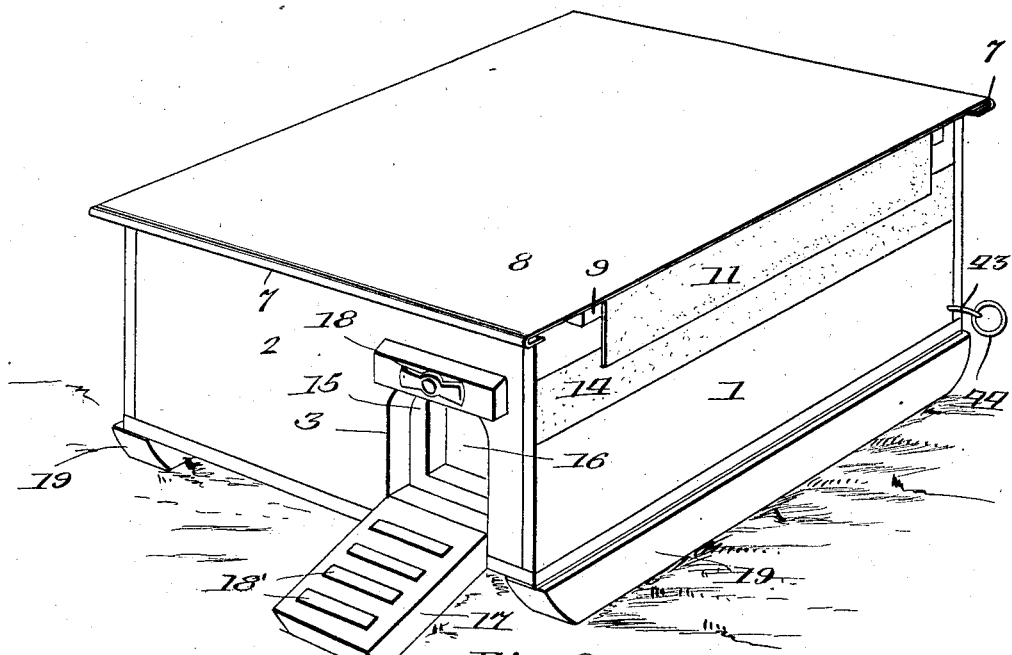
Figure 2:
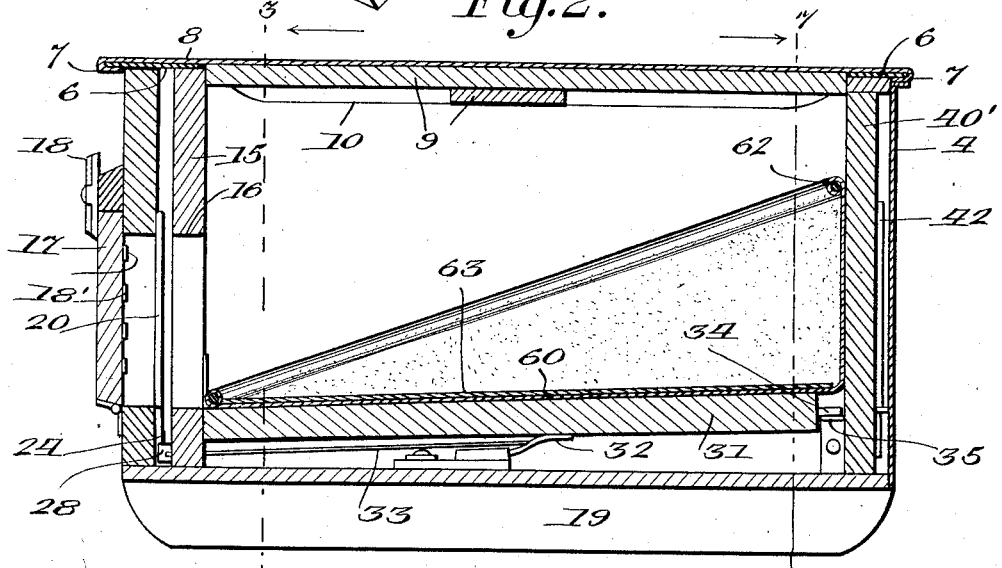

The invention in all of its details will be fully understood from the following description and claims when the same are read in connection with the drawings, accompanying and forming part of this specification, in which:

Figure 1 is a perspective of my novel chicken separator, showing the entrance openings therein. Fig. 2 is a vertical section of the separator extending from front to rear thereof. Fig. 3 is a transverse section taken in the plane indicated by the line 3—3 of Fig. 2, looking forward. Fig. 4 is a detail view showing in closed position the gravitating door that controls the entrance openings. Fig. 5 is a detail on an enlarged scale showing the relative arrangement of the turn-button and the shaft with which the same coöperates. Fig. 6 is a perspective showing the mechanism for bringing about the release and gravitation of the front door when the vertically movable floor or false bottom is depressed by a predetermined weight of chickens. Fig. 7 is a broken transverse section taken in the plane indicated by the line 7—7 of Fig. 2, looking rearward or toward the back end of the separator body. Figs. 8 and 9 are enlarged fragmentary views illustrative of the door for controlling the exit openings, together with the appurtenances of said door. Fig. 10 is a detail view showing one way of attaching the litter sack and its frame to the back wall of the body.

Similar numerals of reference designate corresponding parts in all of the views of the drawings.

The body 1 of the separator is provided in its front wall 2 with an entrance opening 3, and is provided in its rear wall 4 with an exit opening 5. On the upper edges of the front and rear walls of the body are flanges 6, and slidably engaged with said flanges 6 are complementary flanges 7 on the removable top 8 which is preferably of sheet-metal, and is rendered rigid or stiff by wood portions 9 fixedly connected to its under side. Recesses 10 are provided in the upper edges of the side walls of the body for the passage of the said wood portions incidental to sliding the top on and off the body. At its ends the said top is provided with curtains 11. These curtains serve to exclude the weather while permitting the free passage of air. Said curtains are preferably set out from the side walls to permit free passage of air to and from the interior of the separator.

In one side wall of the body is formed an opening 12 barred by a wire screen 13 attached to the inner side of said side wall, and above the said opening 12 is arranged an awning such as disclosed in my contemporary application for patent on brooder of even date herewith Serial Number 691,594, or if preferred the said opening 12 can be permanently covered by a strip 14, of muslin or other suitable textile material, calculated to afford ventilation and at the same time exclude drafts of air.

Suitably fixed within the body and spaced from the front wall 2 is an upright wall 15. This upright wall 15 is provided with an entrance opening 16 in alinement with the opening 3 in wall 2. When desired the opening 3 may be closed by a door 17 hinged below the opening and adapted to be secured in closed position by a turn-button 18 to prevent rats, etc., reaching the gravitating door. On its upper and inner side the door 17 is provided with foot-holds 18', so that when the door is let down in inclined position the chickens can readily climb from the ground to the entrance opening 3. I would have it understood in this connection that the body can be mounted on runners 19, as shown, so as to facilitate its movement from place to place, or can be positioned on any other suitable support without involving departure from the scope of my invention. It is well, however, in all cases to maintain the bottom of the body above the ground and in such manner as to permit of free circulation of air between the bottom and the ground.

Disposed and movable vertically in the space between the front wall 2 and the upright wall 15 is a gravitating door which has for its function to control the entrance openings 3 and 16. The said door comprises a U-shaped frame 20, preferably of wire, a cross-bar 21 extending between and fixed to the sides of the U-shaped frame at an intermediate point in the height thereof, an arm 22 extending from one end of the U-shaped frame and pivoted at 23, and a finger 24 carried by the arm 22 and arranged at the opposite side of the pivot, with reference to the U-shaped frame. In addition to the frame and its appurtenances the door comprise a sack 25, of muslin or other suitable material, slipped over the U-shaped frame and the cross-bar 21, and having its thicknesses connected together by an upper line of stitches 26, disposed in the space above the bar 21, and a lower line of stitches 27 disposed in the space below the said bar 21.

Suitably supported in proper position relative to the finger 24 of the gravitating door is a spring trigger 28. This spring trigger extends forward from its point of connection to a point adjacent the inner side of the front wall 2, and is disposed at an acute angle to said front wall, and it is provided at its free end with a rearwardly extending portion that is disposed at a right angle to the said wall 2. Hence it will be manifest that when the door is raised by the finger of the operator, the finger 24 of the door frame will press the spring trigger out of the way and assume a position between the rearwardly extending portion of the spring trigger and the entrance opening. This will maintain the door in raised position so as to permit of the chickens entering the separator, and when the rearwardly extending portion of the spring trigger is pulled rearwardly by means hereinafter described, the door will promptly gravitate to its closed position, and will remain in said position so as to prevent the entrance of additional chickens. There is nothing except soft cloth below the bar 21 of the door, and hence if a chicken is caught beneath the falling door, the chicken will not be injured, but on the other hand can freely move from under the door whereupon the door will continue its gravitation to the completely closed position.

Hinged at 30 to the upright wall is a vertically-movable floor, preferably a false bottom 31, and disposed below the said false bottom and arranged at or adjacent the center thereof is a curvilinear spring plate 32. The said spring plate is suitably fixed, as by a screw in the slot Fig. 6, on the bottom of the body, and from the point of fixture is carried upward and rearward to a position under the false bottom. Hence it will be manifest that when the false bottom is depressed the upper and rear end of the spring plate 32 will be moved rearward. The said end is connected through a wire 33 or any other suitable cable with the rearwardly extending portion of the spring trigger 28, and from this it follows that when the gravitating door is secured by the trigger in open position, the depression of the false bottom will bring about the release and gravitation of the door. At its free end—i. e., its end remote from the hinge connection, the false bottom is provided with a pin 34 which extends rearwardly therefrom. Said pin 34 bears on the free and vertically movable portion of a transversely disposed spring plate 35. Said spring plate 35 is supported at one end on and is connected to a block 36, fixed in the separator body, and disposed and movable under the free portion of the spring plate and in the direction of the length thereof is a suitably guided block 37. The pin 34 bears on the spring plate 35 at the opposite side of the block 37, with reference to the block 36, and by adjusting the block 37 the tension of the free portion of the spring plate 35 may be regulated, and the capacity of the separator—i. e., the weight of chickens under which the false bottom 31 will be depressed, may be predetermined. The block 37 is provided with a threaded aperture which may be formed in a nut or the like fixed in the said block 37. Said threaded aperture is for the reception of the threaded portion of a transversely disposed shaft which extends outward through the fixed block 36 and the adjacent side wall of the body, and is provided outside the body with a crank. It will also be observed in this connection that the said shaft which is numbered 38 is provided outside the body with a circumferential groove 39. This groove 39 serves to receive a portion of a turn-button 40, and when the turn-button 40 is in the groove, the shaft 38 can be turned about its axis but cannot move rectilinearly in the direction of its length. Consequently rotation of the shaft will be accompanied by movement of the block 37, and regulation of the tension of the spring plate 32, and when rotation of the shaft is stopped the block 37 will be securely held against casual movement. It will further be understood that when the turn-button 40 is swung out of the groove 39 in shaft 38, the said shaft and the block 37 can be moved rectilinearly to any position desired, and can then be returned to such position as to enable the turn-button to seat in the said groove.

Suitably fixed within the body and spaced from the rear wall 4 thereof is an upright wall 40' having an exit opening 41 that is alined with the opening 5 in the wall 4.

The said openings 5 and 41 are preferably arranged at or about midway between the side walls of the body. My present invention contemplates the opening of the rear openings 5 and 41 synchronously with the closing of the front openings 3 and 16, and to the said end I employ the door 42, disposed and adapted to swing in the space between the walls 4 and 40. The said door 42 is opened incidental to depression of the false bottom 31, and consequently it is feasible to make it of sheet-metal or any other suitable material, inasmuch as there is no liability of its injuring a chicken when it moves to its open position. Said door 42 is designed to be manually closed, as when the separator is set, and in order that the door may be conveniently closed, I provide the cable 43 which is connected to the door and extends through one side wall of the body, and is provided outside the body with a suitable handle 44 which *per se* may be of any description. By pulling outward on said handle the operator is enabled to expeditiously and easily close the door 42, and said door 42 will remain of itself in the closed position until the false bottom 31 is depressed, when said door will swing into its open position. The door 42 is provided at one side with a depending portion 44$^a$, and when open the door rests on a support 45. The depending portion 44$^a$ of the door is pivoted at 46 to the wall 40′, and the cable 43 is connected to the said depending portion at a point above the pivot 46. It is this arrangement that enables the operator by pulling on the handle 44 to close the door 42, as in setting the separator.

In order to bring about opening of the door 42 when the false bottom 31 is depressed so as to enable the chickens to pass from the separator into a coop placed at the back of the separator, I provide the means best shown in Fig. 8. The said means comprises a curvilinear spring plate 50 somewhat similar in construction and arrangement to the before described spring plate 32, and having its upper end free and disposed at the under side of the vertically movable floor or false bottom, and a wire or other suitable cable 51 extending between and connected to the free end of the plate 50 and the depending portion 44$^a$ of the door 42. The connection of the cable 51 to the said door portion is at a point above the pivot 46, and hence when the free end of the spring plate 50 is pressed downward by the depression of the false bottom 31, the door 42 will be swung closed and will remain in such position. When the door 42 is swung open its center of gravity is at one side of the pivot 46, and when the door is closed its center of gravity is at the opposite side of the pivot 46. It is this provision that assures the door remaining in its open position and in its closed position and against casual movement from said positions.

When deemed necessary the upright wall 15 may be connected with the front wall 2 by screws or other suitable means and this detachably so as to permit of the ready removal of the wall 15 and floor 31 from the body, as a unit, when it is desired to clean or spray the interior of the body.

At 60 is a little sack, of cloth or other material suitable to the purpose, which is preferably of the general shape shown—*i. e.*, it comprises a bottom wall, two side walls and a back wall. From the top of the rear wall the two side walls taper in a straight line to the base of the inside edge of wall 15, and the sack is held very snugly against the wall 15 at its extreme bottom and immediately over the free space left around the vertically-movable floor or false bottom. The edges of the movable bottom 31 must necessarily be unattached to anything fixed or stationary except where hinged to the wall 15. Therefore a free space is left all around the movable bottom between it and the inside of the body, and the main object of the litter sack is to securely protect said free space from litter and debris of every kind. Otherwise the most important operation or capacity of function of the invention would be prevented by the debris.

It will be noted that the litter sack is a box made of one continuous piece of strong cloth with the upper edges of its side walls beginning at the base of the wall 15 and gradually rising to a point on the rear wall 40′ about three-fourths of an inch above the exit opening 41. The litter sack is secured in said position by means of a strong wire frame 62, shaped to fit snugly the inside square of the body; the said frame being detachably secured in the upper edge of the litter sack by means of a casing stitched around the frame portions at the top of the sack. A small slot 70$^c$ is cut in the back top center of the casing for the insertion of the wire frame, the frame being cut at said point for insertion. The loose end portions of the wire frame are securely held under the edges of a small grooved piece 70$^d$ of sheet-metal tacked to the inside of the body wall 40′ at the height of the back wall of the litter sack when the bottom of the sack is resting on the top of the movable floor or false bottom as fully depressed. It will also be understood in this connection that the back wall of the sack is cut out to form an exit opening 70$^e$ in registration with the exit openings of the body.

It will be gathered from the foregoing that the litter sack contributes materially to the warmth of the separator by making the second or auxiliary dead-air space under the chickens, and serves as a warm lining for the chicks to nestle against; also, the peculiar shape of the litter sack renders the front wall 15 much more undesirable for the chicks to hover against than if the separator were cloth lined, and therefore the peculiar sack tends to make the chicks seek the rear lined portion of the separator, which position of the chicks is in keeping with the principle of the separator. Moreover the peculiar sack contributes to the cheapness of the device and adapts the device as a whole to be easily cleaned. It also follows that the sack can be expeditiously and easily removed when occasion demands for cleaning and spraying, and that subsequent to the removal of the sack the wall 15 and the movable bottom 31 can be removed, as before described.

The entire bottom of the litter sack is covered with a thin piece of strong fiber board 63 which lies loosely on the bottom of the sack and under the litter. The said board renders the sack dry and warm, and protects the sack from being soiled and from being scratched out of position and injured by chicks when searching for feed.

In the foregoing connection I would have it distinctly understood that the litter sack may be secured above the movable floor or false bottom 31 in any approved manner without involving departure from the scope of my claimed invention.

It will further be gathered from the foregoing that my novel separator is simple and inexpensive in construction and reliable in operation, and that it does not embody any delicate parts such as are likely to get out of order; also, that by the use of the separator the great poultry-raising industry may be increased to twenty times or more its present magnitude with no additional increase in labor, this because the separator does the work for the attendant or attendants.

Having described my invention, what I claim and desire to secure by Letters-Patent, is:

1. In a device of the character described, the combination of a body having an opening in one of its walls for the exit of chickens, a yieldingly supported and vertically movable floor in the body, a pivoted door constructed and arranged when moved to gravitate to its open position, and means actuated by depression of said floor for moving the door from its closed position toward its open position.

2. In a device of the character described, the combination of a body having an opening in one of its walls for the exit of chickens, a yieldingly supported and vertically movable floor in the body, a door having a depending portion at one side pivoted to said wall adjacent one side of the exit opening, means movable by depression of said floor, and a cable connected with said means and also connected with the depending portion of the door at a point below the pivot point thereof.

3. In a device of the character described, the combination of a body having an opening in one of its walls for the exit of chickens, a yieldingly supported and vertically movable floor in the body, a door having a depending portion at one side pivoted to said wall adjacent one side of the exit opening, means movable by depression of said floor, a cable connected with said means and also connected with the depending portion of the door at a point below the pivot point thereof, and means connected with the depending portion of the door at a point above said pivotal connection and extending outside the body and adapted when pulled upon to close the door.

4. In a device of the character described, the combination of a body having an opening in one of its walls for the exit of chickens, a yieldingly supported and vertically movable floor in the body, a door having a depending portion at one side pivoted to said wall adjacent one side of the exit opening, means movable by depression of said floor, a cable connected with said means and also connected with the depending portion of the door at a point below the pivot point thereof, a wall arranged at the opposite side of the door, with reference to the first-named wall, and having an exit opening in alinement with that of the first-named wall, a support for the door, when opened, arranged between the two walls, and means connected with the depending portion of the door at a point above said pivotal connection and extending outside the body and adapted when pulled upon to close the door.

5. In a device of the character described, the combination of a body having an opening in one of its walls for the exit of chickens, a yieldingly supported and vertically movable floor in the body, a door normally closing said opening, and means actuated by depression of said floor for opening the door.

6. In a device of the character described, the combination of a body having an opening in one of its walls for the entry of chickens and an opening in one of its walls for the exit of chickens, a normally open door controlling the first-named opening, a normally closed door controlling the second-named opening, a yieldingly-supported and vertically movable floor in the body, means actuated by depression of said floor for bringing about the closing of the first-named door, and means actuated by depression of said door for synchronously bringing about opening of the second-named door.

7. In a device of the character described, the combination of a body having an opening in one of its walls for the entry of chickens and an opening in one of its walls for the exit of chickens, a normally open door controlling the first-named opening, a normally closed door controlling the second-named opening, a yieldingly-supported and vertically movable floor in the body, means actuated by depression of said floor for bringing about the closing of the first-named door, means actuated by depression of said floor for synchronously bringing about opening of the second-named door, and a litter sack arranged above the vertically movable floor and having a bottom and also having a back portion and side portion; said sack being arranged and secured in the body.

8. In a device of the character described, the combination of a body having an opening, a door for controlling said opening, a vertically movable floor hinged at one end in the body and having a projection, means actuated by depression of said floor for bringing about movement of the door, a support, a spring plate connected to and extending from said support and having a free portion disposed under said projection of the floor, a support movable under said free portion of the spring plate in the direction of the length thereof, and means for adjusting said movable support.

9. In a device of the character described, the combination of a body having an opening, a vertically movable door for controlling said opening, a vertically movable floor disposed in the body, means actuated by depression of said floor for bringing about movement of the door, a litter sack disposed in the body and above said floor and having a bottom wall, a back wall and two side walls, and a board disposed on and covering the bottom wall of the sack, and disposed under the litter.

10. In a device of the character described, the combination of a body having an opening, a vertically movable door for controlling said opening, a vertically movable floor disposed in the body, means actuated by depression of said floor for bringing about movement of the door, a litter sack disposed in the body above said floor and having a back wall and a bottom wall and also having two side walls tapered forwardly to the front edge of the movable floor, and a frame cased in the top edge of the sack and inclined downward and forward from the back wall to the inner front wall of the body.

11. In a device of the character described, the combination of a body having an entrance opening and an exit opening, an upright wall in the body, a vertically-movable yieldingly-supported floor hinged to said upright wall and arranged in said body; said wall and floor being removable as a unit, doors controlling the entrance opening and the exit opening, respectively, means actuated by depression of the floor for synchronously closing the entrance-opening door and opening the exit-opening door, and a litter sack removably arranged above the movable floor and having a bottom wall and a back wall in which is an exit opening and also having side walls tapered from the back wall to the joint between the upright wall and the movable floor.

12. In a device of the character described, the combination of a body having an entrance opening and an exit opening, an upright wall in the body, a vertically-movable, yieldingly-supported floor hinged to said upright wall and arranged in said body; said wall and floor being removable as a unit, doors controlling the entrance opening and the exit opening, respectively, means actuated by depression of the floor for synchronously closing the entrance-opening door and opening the exit-opening door, a litter sack removably arranged above the movable floor and having a bottom wall and a back wall in which is an exit opening and also having side walls tapered from the back wall to the joint between the upright wall and the movable floor, a frame cased in the upper edge of said sack and attached to the back wall and inclined downward from said back wall to the said upright wall at the connection of the latter to the movable floor, and a board arranged on and covering the bottom of the sack.

13. In a device of the character described, the combination of a body, a movable floor therein, and a litter sack arranged in the body and above said floor and having a bottom wall and a back wall and also having side walls tapered from said back wall to the inner side of the front wall of the body.

14. In a device of the character described, the combination of a body, a movable floor therein, and a litter sack arranged in the body and above said floor and having a bottom wall and a back wall and also having side walls tapered from said back wall to the inner side of the front wall of the body, and an inclined frame attached to the upper edges of said walls of the sack.

15. In a device of the character described, the combination of a body, a movable floor therein, and a litter sack arranged in the body and above said floor and having a bottom wall and a back wall and also having side walls tapered from said back wall to the inner side of the front wall of the body, and a board arranged on the bottom wall of the sack.

16. In a device of the character described, the combination of a body, a movable floor therein, and a litter sack arranged in the body and above said floor and having a bottom wall and a back wall and also having side walls tapered from said back wall to the inner side of the front wall of the body, an inclined frame attached to the upper edges of said walls of the sack, and a board arranged on the bottom wall of the sack.

In testimony whereof I have hereunto set my hand in presence of two subscribing witnesses.

ISAAC J. PLOUGHE.

Witnesses:
WILLIAM HULL GILLES,
STEPHEN BENSON.

Copies of this patent may be obtained for five cents each, by addressing the "Commissioner of Patents, Washington, D. C."